US009519596B2

(12) United States Patent
Coppola et al.

(10) Patent No.: US 9,519,596 B2
(45) Date of Patent: Dec. 13, 2016

(54) RESOURCE ACCESS CONTROL IN A SYSTEM-ON-CHIP

(71) Applicants: STMICROELECTRONICS (GRENOBLE 2) SAS, Grenoble (FR); Technological Educational Institute of Crete, Crete (GR)

(72) Inventors: Antonio-Marcello Coppola, Sassenage (FR); Georgios Kornaros, Crete (GR); Miltos Grammatikakis, Crete (GR)

(73) Assignees: STMICROELECTRONICS (GRENOBLE 2) SAS, Grenoble (FR); TECHNOLOGICAL EDUCATIONAL INSTITUTE OF CRETE, Crete (GR)

( * ) Notice: Subject to any disclaimer, the term of this patent is extended or adjusted under 35 U.S.C. 154(b) by 26 days.

(21) Appl. No.: 14/629,613

(22) Filed: Feb. 24, 2015

(65) Prior Publication Data

US 2015/0254189 A1 Sep. 10, 2015

(30) Foreign Application Priority Data

Mar. 6, 2014 (FR) ...................................... 14 51819

(51) Int. Cl.
*G06F 12/00* (2006.01)
*G06F 12/14* (2006.01)
*G06F 9/455* (2006.01)

(52) U.S. Cl.
CPC ......... *G06F 12/145* (2013.01); *G06F 9/45533* (2013.01); *G06F 12/1441* (2013.01); *G06F 2009/45587* (2013.01); *G06F 2212/1052* (2013.01)

(58) Field of Classification Search
USPC ........................................................ 711/163
See application file for complete search history.

(56) References Cited

U.S. PATENT DOCUMENTS

| 8,185,934 | B2 | 5/2012 | Catalano et al. | |
|---|---|---|---|---|
| 8,661,181 | B2 | 2/2014 | Liljeberg | |
| 2005/0086661 | A1* | 4/2005 | Monnie | G06F 9/526 719/310 |
| 2006/0004942 | A1* | 1/2006 | Hetherington | G06F 9/3802 711/3 |
| 2013/0125119 | A1 | 5/2013 | Vipat et al. | |
| 2015/0121366 | A1* | 4/2015 | Neiger | G06F 9/4555 718/1 |

* cited by examiner

*Primary Examiner* — Jared Rutz
*Assistant Examiner* — Hamdy S Ahmed
(74) *Attorney, Agent, or Firm* — Allen, Dyer, Doppelt, Milbrath & Gilchrist, P.A.

(57) ABSTRACT

A method for controlling access of a processor to a resource, wherein the processor has an instruction set including a virtualization extension, may include executing a resource access instruction by the processor using the virtualization extension, whereby the resource access instruction conveys a virtual address (VA) and a virtual machine identifier. The method may also include translating the virtual address to a physical address based on the virtual machine identifier, and looking-up an access control rule table using the physical address as a search key. Each entry of the rule table includes a virtual machine identifier. The method further includes controlling access to the resource based on the output of the rule table and a match between the virtual machine identifier returned by the table and the virtual machine identifier conveyed in the resource access instruction.

11 Claims, 1 Drawing Sheet

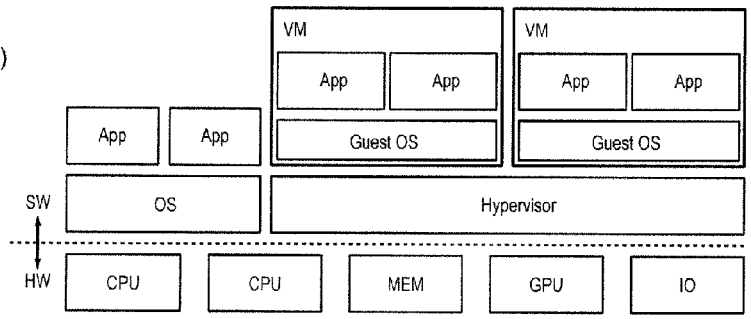
Fig 1
(Prior Art)
Fig 2
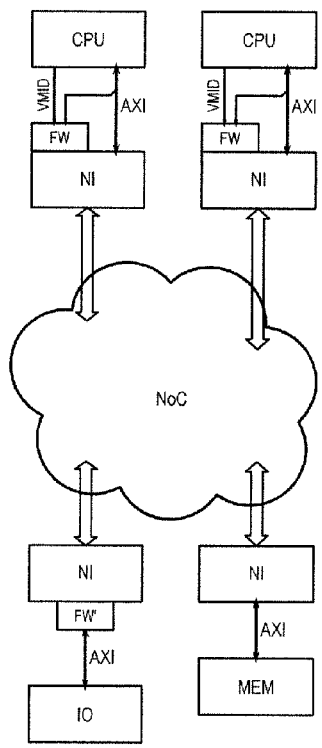
Fig 3
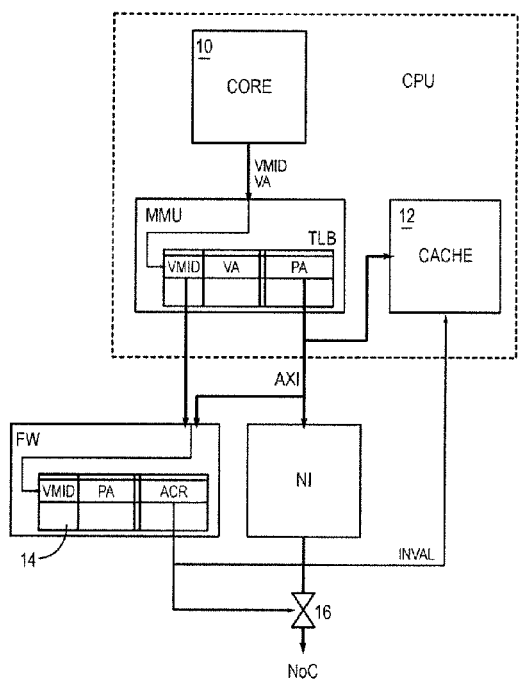

RESOURCE ACCESS CONTROL IN A SYSTEM-ON-CHIP

TECHNICAL FIELD

The invention relates to controlling access to resources, in particular to memory areas that may contain sensitive data reserved to specific processes. The invention relates more specifically to implementing access control in a system-on-chip providing virtualization, extending existing security protection mechanisms, such as those based on "secure/non-secure domain" design principles, by allowing validating permissions on a finer level of granularity.

BACKGROUND

FIG. 1 illustrates a typical system-on-chip (SoC) "ecosystem", comprising hardware components HW under a dashed line, and software components SW above the dashed line. The hardware components may include multiple processing units CPU, a shared memory MEM, a graphics-processing unit GPU, and other hardware accelerators, peripheral or input/output devices IO.

Software components designed to run on that hardware may include an operating system OS in which individual application programs (App) may be executed. In some instances, the software may instead include a hypervisor that can run multiple virtual machines VM. Each virtual machine may then run its own guest operating system and specific application programs.

The use of virtual machines may be desired in situations needing tight isolation between operating environments on a same device. For instance a user may install two virtual machines on a smartphone, a first one provided by his employer for business use, and the second one for personal use. The virtual machine for business use would implement strict security policies to restrict access to company information, and thus limit the features available to the user. To benefit from the full feature set of the smartphone, the user would switch to the second virtual machine that has no restrictions.

In theory, the data of the virtual machines are isolated from each other, i.e. one virtual machine cannot access the data of another virtual machine even though the data is stored in the same memory of the SoC. The hypervisor ensures this isolation, in particular, by mapping the address spaces used by the virtual machines to non-overlapping physical address spaces on the SoC.

In practice, however, a rogue program running in a virtual machine may be designed to exploit security vulnerabilities of the hypervisor, for instance using buffer overflow or "virtual machine escape" techniques. With such exploits, the rogue program may access data beyond the address space assigned to the virtual machine and reach sensitive data belonging to the host system or to another virtual machine.

SUMMARY

In view of the foregoing, a method is proposed herein for controlling access of a processor to a resource, wherein the processor has an instruction set including a virtualization extension. The method comprises executing a resource access instruction by the processor using the virtualization extension, whereby the resource access instruction conveys a virtual address and a virtual machine identifier. The method also includes translating the virtual address to a physical address based on the virtual machine identifier and looking-up an access control rule table using the physical address as a search key. Each entry of the rule table includes a virtual machine identifier. The method further includes controlling access to the resource based on the output of the rule table and a match between the virtual machine identifier returned by the table and the virtual machine identifier conveyed in the resource access instruction.

The step of controlling access may comprise granting access to the resource if the rule table returns no entry. The step of controlling access may comprise denying access by ignoring the instruction. Denying access may comprise invalidating the content of a cache memory of the processor.

In an embodiment, the resource and the processor may be connected through a network-on-chip (NoC), and the steps of looking-up the access control rule table and controlling access may be performed in a network interface configured to couple the processor to the network-on-chip.

A system-on-chip may be provided, comprising a network-on-chip (NoC), a resource connected to the network-on-chip, and a processor comprising a virtual address to physical address translation table and an instruction set including a virtualization extension. The execution of a resource access instruction by the processor using the virtualization extension produces a virtual machine identifier stored in the translation table with the virtual address. The system-on-chip may also include a network interface coupling the processor to the network-on-chip for accessing the resource, and an access control rule table having an input wired to receive the physical address output by the translation table as a search key and the corresponding virtual machine identifier. Each entry of the rule table includes a virtual machine identifier. Access control logic is coupled to the output of the rule table and configured to control access to the resource at the network interface level based on the output of the rule table and a match between the virtual machine identifier returned by the table and the virtual machine identifier input to the table.

The system may comprise multiple processors, each coupled to the network-on-chip through a respective network interface, similar access control logic, and a similar access control rule table for each network interface. The system may further comprise a master device, a network interface coupling the master device to the network-on-chip, and an auxiliary access control rule table having a search key input wired to receive a current physical address from the master device. The system may also include access control logic coupled to the output of the auxiliary rule table and configured to control access to the resource at the network interface level based on the output of the auxiliary rule table.

BRIEF DESCRIPTION OF DRAWINGS

FIG. 1 illustrates an exemplary high-level system-on-chip ecosystem including hardware and software components in accordance with the prior art.

FIG. 2 is a schematic diagram of hardware components of a system-on-chip interconnected through a network-on-chip in accordance with an embodiment of the present invention.

FIG. 3 is a schematic diagram of an access control device implemented between a processing unit and a network interface in accordance with an embodiment of the present invention.

DESCRIPTION OF EMBODIMENTS

The hardware components of systems-on-chip are often interconnected through a network-on-chip (NoC). FIG. 2 schematically shows such an interconnection. Each hardware component, here two CPUs, a shared memory MEM, and an input/output device IO, is connected to the NoC through a respective network interface NI. Some hardware components, in particular the processing units, may be delivered by third parties in the form of "black-box" RTL code and are usable through a standard interface, such as the AXI bus according to the AMBA® standards. All the hardware components of a same SoC are usually designed to use the same bus. Therefore, in this example, each hardware component is connected to its respective network interface through an AXI bus.

On the software side, a hypervisor may run on all CPUs and have access to all the system resources. A virtual machine spawned by the hypervisor may be assigned a specified portion of the resources, and may be allowed to use any number of the available CPUs, depending on the computing power required by the virtual machine.

In the context of a macroscopic network (LAN or WAN), computers connected to the network may share data using standard network protocols. Such data sharing can be controlled through firewalls usually implemented in routers placed between network segments. The firewalls apply rules based on source and target addresses, and application-level protocols. The source and target addresses are the IP addresses of the source and target computers when using the TCP/IP transport protocol. The term "computer" may include "virtual machine". Indeed, virtual machines running on a same computer may be configured by the hypervisor to be seen on the LAN as independent computers, with distinct IP addresses.

A similar approach may be used in a NoC, where the hardware components or their network interfaces would replace the computers connected to a LAN. U.S. Pat. No. 8,185,934 discloses a resource access control device implementing such an approach. The access control is based on physical target addresses and source node identifiers. A "source node" is in practice a network interface or the corresponding hardware component.

Such an approach does not allow controlling access between two virtual machines running on a same processor, since the two virtual machines then use the same source node an cannot be differentiated, i.e. an access restriction based on a source node would restrict access from all virtual machines running on the same processor. Thus an access control based on virtual machine identification on a NoC is desirable. A NoC, using low-level protocols and simple hardware for optimizing speed and latency, provides nothing equivalent to an IP address that can be flexibly assigned to a computer or a virtual machine on a LAN. The bus used for connecting each hardware component to the network interface NI, for instance an AXI bus, does not convey information directly usable to identify virtual machines initiating transactions. In fact, the NoC is transparent to the processors and the programs running on the processors, which see the hardware components of the system as if they were sharing the same AXI bus.

Processors used in SoCs may offer so-called "virtualization extensions", which are specific instructions used for accelerating virtual machine execution. Such instructions convey a parameter VMID that identifies the virtual machine that executes the instruction. The virtual machine identifier VMID is however used internally in the processor and is not provided on the AXI bus. Use of the VMID is explained, for instance, in "ARM Cortex A-15 Technical Reference Manual, Chapter 5: Memory Management Unit".

FIG. 2 schematically illustrates a firewall configuration that may use the virtual machine identifier VMID with a minor hardware modification of the processing units. A firewall device FW is integrated in a network interface NI assigned to a processing unit CPU. In order to achieve better flexibility, as shown, a similar firewall device is integrated in each network interface assigned to a CPU. The device FW is wired to receive the address lines of the AXI bus and the VMID conveyed by the currently executed instruction, tapped from within the processing unit. Further details are explained with reference to the next figure.

FIG. 3 schematically illustrates an embodiment of the firewall device FW and further details of an exemplary processing unit CPU. The CPU usually comprises a core 10 in charge of executing the instructions, a memory management unit MMU, and a cache memory 12 (CACHE).

Application programs may be designed to use a uniform address space called "virtual memory" (which should not be mistaken with the memory space allocated to a virtual machine, i.e. real machines also use such virtual memory). In that case, the addresses conveyed in the instructions executed on the core 10 are virtual addresses VA.

The memory management unit MMU is configured to translate the virtual addresses VA presented by the core to the actual physical addresses PA that are used for accessing the resources. The translation may be carried out by a translation look-aside buffer TLB that is configured at system boot by the operating system or the hypervisor. In operation, the TLB may be refreshed by the operating system or hypervisor upon context switches. The physical addresses PA output by the TLB are presented on the AXI bus and used also by the cache memory 12. For sake of clarity, only the address lines of the buses are shown.

When virtual machines are used, each virtual machine offers a same virtual address space to the application programs running within it. This implies that instructions executed within distinct virtual machines may use the same virtual addresses VA. One role of the VMID used by processors having a virtualization extension is to differentiate the virtual address spaces used by the different virtual machines in the TLB. In practice, the VMID values may be appended, as shown, to the most significant bits of the virtual addresses contained in the TLB to form the search keys of the TLB entries.

For sake of simplicity, the TLB entries are shown as containing the full virtual and physical addresses VA, PA. In practice the virtual addresses are separated in an "offset", an "index" and a "tag", wherein only the tag is contained in the TLB rows with the VMID, and the offset forms the least significant bits of the physical address PA. The detailed structure and operation of a TLB are out of the scope of this disclosure, and unnecessary to understand the principles described herein. The TLB may be considered ideally as a content-addressable memory (CAM) where the pair (VMID, VA) is used as the search key to find the corresponding physical address PA.

As mentioned previously, the firewall device FW is wired to receive the physical address PA conveyed on the AXI bus, output by the TLB, and the corresponding VMID. The processing unit is not originally configured to output the VMID. It may be modified so that the VMID can be tapped at the same time as the physical address PA. For this purpose, the TLB may be modified to output the VMID with the physical address PA, as illustrated.

As an alternative, the VMID may be tapped from the search key input lines of the TLB. The VMID may then require synchronization with the output of the TLB through a latch.

The firewall device FW includes a hardware access control table 14, which may be considered ideally as a content-addressable memory. In practice it may have a similar structure as the TLB of the MMU and be managed in a similar fashion by the hypervisor. The table 14 is designed to assign access control rules ACR to specified pairs of virtual machine and physical address values (VMID, PA), i.e. the current pair (VMID, PA) is used as the search key in table 14 to find the corresponding ACR rule. The firewall device FW is configured to implement the ACR rules output by the table, for instance, between the network interface NI and the NoC, as illustrated by a gate 16.

An access control rule ACR may include a few bits for encoding usual file system rights such as read-only, read/write, write-only, none. By default, the absence of data in the access control table 14 corresponds to a conventional system where no access control is implemented.

The access control table may be populated by the hypervisor at boot time for a set of preconfigured virtual machines. The table may also be modified at run time as further virtual machines are installed or existing virtual machines are removed.

In practice, the table 14 may contain only a group of most significant bits of the physical addresses PA, whereby each address entry in the table designates an address range of the size defined by the absent least significant bits. For instance, when the offset bits of the virtual addresses are also used as the offset bits of the physical addresses, and those bits are not stored in table 14, each physical address entry of table 14 designates a memory "page".

In operation, when the core 10 executes a resource access instruction, using the virtualization extension, the virtual address VA and the VMID conveyed by the instruction are provided to the MMU. The TLB is looked-up using the pair of values (VMID, VA) as the search key. The access request is placed on the AXI bus to be forwarded by the network interface together with the physical address PA output by the TLB. In parallel, the access control table 14 is looked-up using the pair (VMID, PA) as the search key. The rule ACR returned by the table is implemented by gate 16 before the NoC takes the access request into account.

If the rule ACR is void, i.e. the table returns a "miss" because there is no entry in the table matching the pair (VMID, PA), the access request may be forwarded normally to the NoC. If the access request is a write request, and the rule denies write permission, the gate 16 may simply void the request, such that the NoC sees no request presented by the network interface NI. In this case the write request is silently ignored: the program that issued the request "thinks" that the write request has completed and continues normally.

If the access request is a read request, and the rule denies read permission, the gate 16 may again void the request as seen from the NoC. However, the read request expects data to be returned at some point in time. If the request is ignored, no data is returned, and the program that issued the request may stall. Since that program is performing unauthorized operations, making it stall may be a satisfactory approach. Such unauthorized read and write requests are thus not forwarded to the NoC, whereby the NoC cannot become saturated with repeated unauthorized requests, such as produced, for instance, by denial-of-service attacks.

An alternative response of the firewall to an unauthorized read request would be to let the request through with a modified physical address pointing to a specific area containing zero or random data. The program that issued the request will see no error and continue with useless data. Thus causing unauthorized operations to be silently ignored makes the technique very simple to implement in hardware.

In some circumstances it may be desirable to notify such operations to take additional measures. The firewall device may then be designed to issue an interruption to signal a read or write error, whereby the hypervisor may be configured to kill the process or virtual machine that performed the unauthorized operation. The event may then also be written in a log.

As described up to now, the firewall device can prevent unauthorized access to address spaces when the access requests are forwarded to the NoC. If the physical address designates data that is stored in the cache memory 12, the CPU accesses the data directly in the cache memory and the request is not presented to the network interface NI, i.e. a gate 16 such as shown in FIG. 3 cannot prevent the unauthorized access.

Although the actual data is accessed in cache, the corresponding (VMID, PA) pair is still seen by the firewall device. Therefore, the firewall device may be designed to invalidate the cache contents through a line INVAL when the table 14 denies access. A "cache-miss" is then produced, forcing the request to go through the NoC, where it can be controlled through gate 16.

As previously mentioned, the rules contained in table 14 may also grant access (read or write) to the corresponding physical addresses. Such access grants may be interpreted by the firewall device as exclusive, i.e. such that only the designated virtual machines have access to the specified physical addresses. This is in fact symmetrical to access denial rules that are also exclusive in that only the designated virtual machines are denied access. For implementing both grant and denial rules, the table 14 may be used in the following manner.

For a current (VMID, PA) pair, the table 14 is looked-up using only the physical address PA as the search key. If the returned entry contains a denial rule, the firewall device denies access only if the entry contains a VMID equal to the current VMID, i.e. if the VMIDs don't match, access is granted by default. If the returned entry contains a grant rule, the firewall grants access only if the VMIDs match, i.e. if the VMIDs don't match, access is denied by default.

Such an operation implies that the physical addresses stored in the table are unique, otherwise the table may return multiple rows. The flexibility provided by this operation mode, in the context of protecting the data belonging to virtual machines from other virtual machines, may however never require that a physical address be present in the table more than once (such as for granting access to one virtual machine and denying access to a number of other virtual machines to the same physical address space). In this context, the table may be kept small, requiring only "secure" virtual machines to be listed with access grants to the physical memory areas that need protection.

As previously mentioned in relation with FIG. 2, a similar firewall device FW is provided preferably in each network interface assigned to a CPU. If the virtual machines are all configured by the hypervisor to use all available CPUs, the access control tables 14 of the firewall devices may have identical contents, so that instructions of a same virtual machine executed on different CPUs are granted the same access rights.

In some circumstances, virtual machines may be configured to use only one CPU. In such a case, access rights defined for that virtual machine may be present only in the firewall device assigned to that CPU. However, for simplifying the table content management, the table contents may remain identical also in this situation.

Certain devices connected to the NoC, other than the processors, such as input/output interfaces IO, may be configured to operate in a bus-master mode. Such devices may then access physical addresses directly through their network interfaces NI, unassisted by a processor, i.e. the access requests would be unseen by the firewall devices FW of the processors, and would not be controllable. In such circumstances, resource contents of the system-on-chip may be made accessible to an external rogue device connected to a master IO interface.

In order to control such access requests, the network interfaces NI of master devices, as shown in FIG. 2 for device IO, may be provided with respective firewall devices FW'. The firewall devices FW' may be a simplified version of the previously described firewall devices FW in that their access control tables do not use virtual machine identifiers VMID, i.e. they only use the physical address conveyed on the AXI bus as a search key. In all other respects the devices FW' may be similar to devices FW.

In an exemplary configuration where the processor firewall devices FW have entries for granting access from specific virtual machines to specific physical address spaces (meaning that access is denied to those address spaces from anything else than the specified virtual machines), the tables of the firewall devices FW' may replicate those address spaces, thus meaning that access is denied to them from the respective master devices. In such a configuration, all the firewall tables (FW and FW') may contain the same physical addresses, whereby their management would be particularly simple and systematic for the hypervisor.

In another exemplary configuration, the tables of the devices FW' may contain entries granting access to specific address spaces, wherein access is denied by default. Such a configuration may be useful in situations where the master devices are known to have access to physical address spaces dedicated to them.

The described use and content of the access control rules are exemplary. Many alternatives and variations will appear to those skilled in the art as to the definition of address ranges, the content of the access control rules, and the interpretation of the rules or the absence of rules. In simple situations, the tables may not need to contain rules specifically: the rule to apply may then be based on the table returning a hit or a miss. For instance, full access is granted if the table returns a hit, and access is denied if the table returns a miss.

What is claimed is:

1. A method for controlling access of a processor to a resource, wherein the processor has an instruction set including a virtualization extension, the method comprising:
    executing a resource access instruction by the processor using the virtualization extension, the resource access instruction conveying a virtual address and a virtual machine identifier;
    translating the virtual address to a physical address based upon the virtual machine identifier, the physical address comprising an actual physical address for accessing the resource without further translation;
    looking-up an access control rule table using the physical address as a search key, each entry of the access control rule table including a virtual machine identifier; and
    controlling access to the resource based on an output of the access control rule table and a match between the virtual machine identifier returned by the access control rule table and the virtual machine identifier conveyed in the resource access instruction, wherein controlling access comprises granting access to the resource if the access control rule table returns no entry.

2. The method of claim 1, wherein controlling access comprises denying access by ignoring the resource access instruction.

3. The method of claim 2, wherein denying access comprises invalidating content of a cache memory of the processor.

4. The method of claim 1, wherein the resource and the processor are connected through a network-on-chip (NoC), and wherein looking-up the access control rule table and controlling access are performed in a network interface configured to couple the processor to the network-on-chip.

5. A method for controlling access to a resource by a processor having an instruction set including a virtualization extension, the method comprising:
    executing a resource access instruction from the processor based upon the virtualization extension, the resource access instruction comprising a virtual address and a virtual machine identifier;
    translating the virtual address to a physical address based upon the virtual machine identifier, the physical address comprising an actual physical address for accessing the resource without further translation;
    looking-up a stored virtual machine identifier in an access control rule table based upon the physical address; and
    controlling access to the resource based upon a match between the virtual machine identifier stored in the access control rule table and the virtual machine identifier in the resource access instruction, wherein controlling access comprises granting access to the resource if there is no stored virtual machine identifier corresponding to the physical address.

6. The method of claim 5, wherein controlling access comprises denying access by ignoring the resource access instruction.

7. The method of claim 6, wherein denying access comprises invalidating content of a cache memory of the processor.

8. The method of claim 5, wherein the resource and the processor are connected through a network-on-chip (NoC), and wherein looking-up the stored virtual machine identifier in an access control rule table and controlling access are performed in a network interface configured to couple the processor to the network-on-chip.

9. An integrated circuit (IC) comprising:
    a network-on-chip;
    a resource coupled to the network-on-chip;
    at least one processor comprising a virtual address to physical address translation table and an instruction set including a virtualization extension, the execution of a resource access instruction by the at least one processor using the virtualization extension producing a virtual machine identifier stored in the virtual address to physical address translation table with a virtual address, the physical address comprising an actual physical address for accessing the resource without translation;
    a network interface coupling the at least one processor to the network-on-chip for accessing the resource;
    an access control rule table having an input to receive a physical address output by the virtual address to physical address translation table as a search key and a corresponding virtual machine identifier, each entry of the access control rule table including a virtual machine identifier; and access control logic coupled to an output of the access control rule table and configured to control access to the resource at a level of the network interface based on the output of the access control rule table and a match between the virtual machine identifier returned by the virtual address to physical address table and the virtual machine identifier input to the control rule table, wherein said access control logic is configured to control access by granting access to the resource if the access control rule table returns no entry.

10. The IC of claim 9, wherein the at least one processor comprises a plurality of processors each coupled to the network-on-chip through a respective network interface; and further comprising further access control logic and a further access control rule table for each respective network interface.

11. The IC of claim 9, further comprising:

a master device;

a further network interface coupling the master device to the network-on-chip;

an auxiliary access control rule table having a search key input to receive a current physical address from the master device; and further access control logic coupled to an output of the auxiliary rule table and configured to control access to the resource at the level of the network interface based on the output of the auxiliary rule table.

* * * * *